United States Patent Office 2,776,695
Patented Jan. 8, 1957

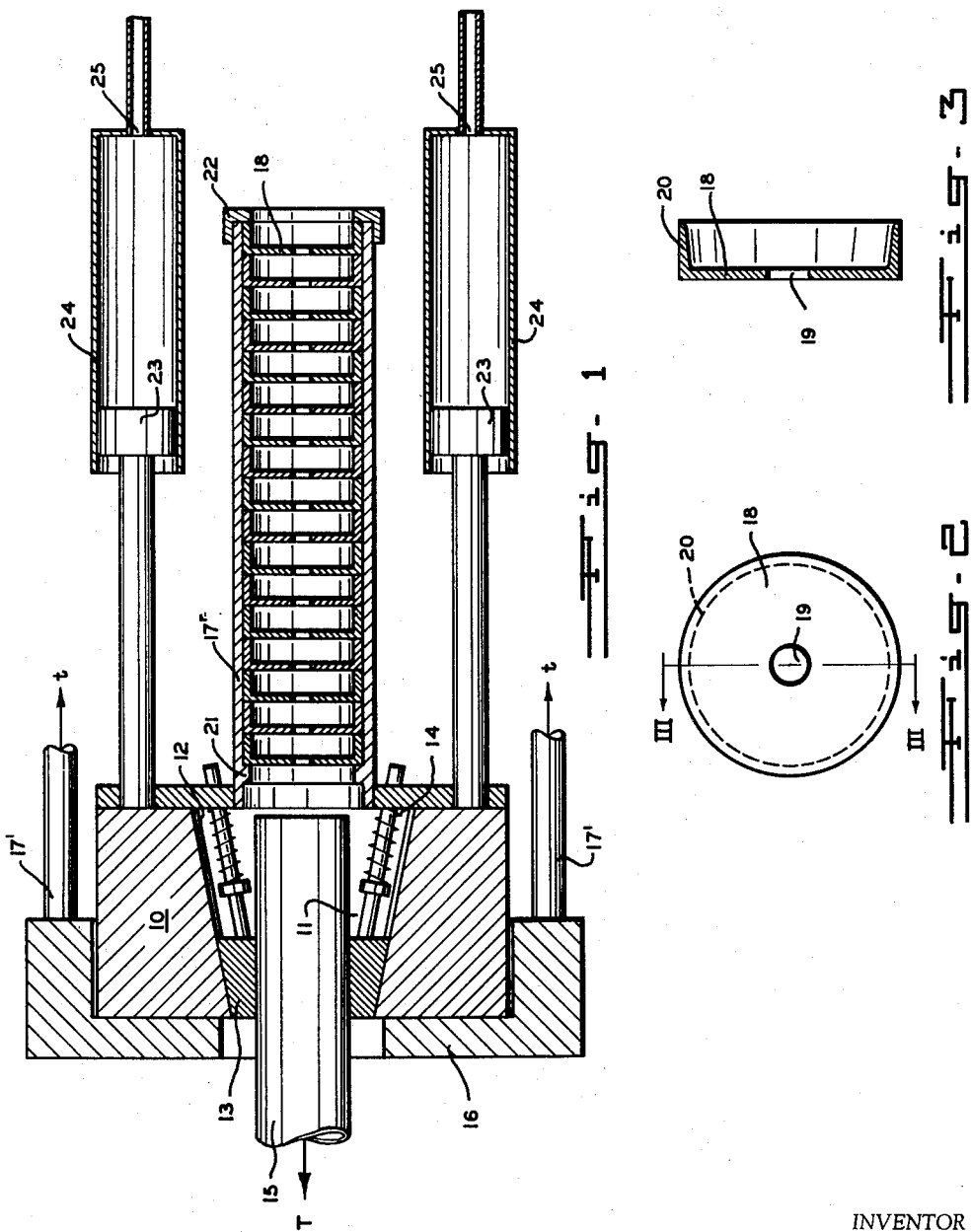

2,776,695

RECOIL SHOCK ABSORBER FOR METAL STRETCHER

Sheldon E. Wells, Youngstown, Ohio, assignor to Lombard Corporation, Youngstown, Ohio, a corporation of Ohio Application January 26, 1954, Serial No. 406,296

3 Claims. (Cl. 153—35)

The present invention relates to apparatus for stretching metal extrusions and the like, and more particularly to improvements in such apparatus for the purpose of reducing shock loads on certain component parts of the apparatus.

In the production of elongated extruded shapes of aluminum and other metals it is common practice to subject the extruded lengths to substantially tension, following the actual extruding operation, so that twists and bends may be removed from the material. Substantial forces are applied to the extruded stock during a "stretching" operation—1000 to 1500 tons being representative—and occasionally the material ruptures, accompanied by the release of large amounts of stored energy.

As the stretched material parts, and particularly where the section ruptures near one end, there is a sharp recoil and the separate pieces are propelled longitudinally toward their respective gripping devices. And it is often a difficult problem, in such cases, to arrest the moving workpiece while at the same time avoiding heavy shock loads on the material gripping members. Accordingly, the invention has, as its primary object, the provision of a stretching device for extruded sections and the like having improved means incorporated therein for arresting the movement of ruptured workpieces. In accordance with the teachings of the invention the kinetic energy of a ruptured workpiece is in part transferred to the gripping head for such workpiece, accelerating the gripping head in a rearward direction against the restraining action of suitable damper or shock absorber means whereby the energy of the workpiece is expended harmlessly and without damage to the gripping head or heads of the stretching apparatus.

A further object of the invention is the provision in a stretching device for extruded sections and the like of an improved gripping head having means therein for arresting the energy of a ruptured workpiece over an extended time period whereby to avoid harmful shock forces and other undesirable effects.

More specifically, it is an object of the present invention to provide an improved gripping apparatus of the type above described wherein is provided a spaced plurality of inexpensive breakable barriers positioned rearwardly of the gripping jaws and in alignment therewith so that when an extruded section ruptures and recoils in a rearward direction toward the gripping head the end of the broken section engages and fractures some or all of the breakable barriers. The arrangement is such that the recoiling section is subjected to a number of relatively small incremental retarding forces over an extended period of time as the spaced barriers are successively broken. Similarly the gripping head is subjected to a plurality of relatively small accelerating impulses over an extended time period. And to further reduce the shock forces applied to the gripping head the same is permitted to move in response to the accelerating impulses thus applied, its movement being dampened, however, by shock absorbing means so that the energy of the ruptured section is eventually dissipated in a harmless manner.

A further and still more specific object of the invention is the provision in an apparatus having the features and characteristics mentioned above of a simple and inexpensive yet highly effective replaceable breakable barrier member which is adapted for easy assembly into a gripping head and which is provided with integral spacing means so that a plurality of such barriers assembled in aligned relation with the gripping head are automatically spaced in the desired manner. Preferably the barriers are formed of material having a certain amount of yieldability so that the retarding effect of each barrier is applied over a more or less extended period before the barrier ruptures.

The above and other objects and advantages of the invention will become apparent upon full consideration of the following detailed specification and accompanying drawing wherein is shown a certain preferred embodiment of the invention.

In the drawing:

Figure 1 is a simplified schematic view of a stretcher apparatus for extruded sections wherein is incorporated the recoil shock absorber mechanism of my invention;

Figure 2 is an end view of a replaceable barrier or rupture disc forming a part of the invention and incorporated in the apparatus of Figure 1; and Figure 3 is a section view taken along line III—III of Figure 2.

Referring now to the drawing, the reference numeral 10 designates generally a stock gripping head having a longitudinal opening 11 therein which is provided with inclined or converging bearing surfaces 12 for adjustably supporting a plurality of stock-engaging grippers or jaws 13. Conventionally, the jaws 13 are urged in a forward direction along the converging surfaces 12 by means of suitable springs 14, the arrangement being such that slight gripping pressure is applied to a stock piece 15 upon its insertion into the longitudinal opening 11.

In a conventional stretching machine there are provided two such gripping heads 10, spaced on a suitable frame, not shown, and it is common to provide means such as a hook or hooks, not shown, for securing one gripping head to the frame, and a high power actuator, also not shown, for applying tension to the other gripping member. In the illustrated apparatus the head 10 is shown by way of representation, as having a separable yoke 16 to which are secured spaced connecting rods 17'. Tension forces $t$ are applied to the rods 17', which may be either anchored or secured to an actuating cylinder, and a resulting tension force T is applied to the extruded workpiece 15.

In accordance with the teachings of the invention the gripper head 10 is open at its rearward end. And secured to the head 10 and extending rearwardly therefrom in alignment with the opening 11 is an elongated sleeve 17. The sleeve 17 is open at its rearward end and is somewhat larger in diameter than the largest principal dimension of the workpiece 15 so that the latter may pass freely through the sleeve.

Received within the sleeve 17 are a plurality of spaced barrier discs 18 which are disposed transversely of the axis of the sleeve 17, providing a plurality of spaced barriers between the end of the workpiece 15 and the open rearward end of the sleeve 17. In the illustrated apparatus the barrier discs 18 are apertured centrally, at 19, and are provided with axially extending peripheral flanges 20 which act in a first capacity to support the discs 18 in transverse disposition within the sleeve 17, and in a second capacity as spacing members so that a plurality of discs may be arranged in longitudinally stacked relation in a desired predetermined spaced arrangement substantially, as shown in Figure 1.

In the apparatus of Figure 1, the sleeve 17 is provided internally with an integral collar 21, located adjacent its forward end, to provide an abutment or stop against which the forwardmost one of a plurality of barrier discs 18 rests. And a removable collar or cap 22 is provided at the outer or rearwardmost end of the sleeve 17 to prevent outward movement of discs 18 assembled within the sleeve. As illustrated, the collar 22 engages only the flange portion of the last disc 18, providing an aperture of sufficient dimensions to receive the workpiece 15.

Secured to the gripper head 10 and extending rearwardly therefrom are spaced plungers 23 which are slidably received in damping cylinders 24. The cylinders 24 are fixed with respect to the machine frame, not shown, or the connecting rods 17', so that when the head 10 moves rearwardly responsive to the recoil impetus of a ruptured workpiece the plungers 23 move rearwardly with respect to the cylinders 24, displacing fluid therefrom. And, in accordance with the teachings of the invention, restricted outlets 25 are provided from the cylinders 24 so that substantial energy is dissipated during the displacement of fluid from the cylinders.

In the normal operation of the apparatus of my invention the workpiece 15 is gripped at both ends, substantially as shown in Figure 1, and tension is applied to the workpiece through the rods 17'. When, and if, the workpiece parts under the tension load the separate pieces recoil in a direction toward their respective gripping heads. Thus, the end section shown in Figure 1 would recoil to the right, attaining a velocity of perhaps 150 feet per second.

During the initial rearward movement of the broken workpiece the jaws 13 are carried along, retracting against the action of springs 14, so that the workpiece is released from the gripping head. Then, as the workpiece continues in its rearward movement the first of the disc-like barriers 18 is engaged and ruptured. The effect of this is, of course, to transfer some of the kinetic energy of the moving workpiece to the gripper head, accelerating the same against the restraining action of the cylinders 24. Also some of the energy of the workpiece is dissipated directly in the form of heat as the barrier or rupture disc 18 is broken.

It is in accordance with the teachings of the invention that the barrier or rupture discs 18 be so proportioned and so constituted as to absorb only an incremental quantity of the total energy of the workpiece before breaking. Thus, the workpiece continues in its rearward travel, periodically engaging and rupturing the discs 18 until the total quantity of energy stored in the workpiece is dissipated.

Of particular importance is the fact that the gripper head 10 is acted upon by a series of relatively small impulses over an extended time period so that at no time is an unduly large or sharp shock force applied which could damage the gripper head or its component parts. Moreover, in response to the series of retarding impulses thus applied by the rupture discs 18 the gripper head is permitted to retract against the restraining action of the shock absorbing cylinders 24, further avoiding the application of any substantial shock forces to the apparatus.

In the preferred form of the invention the barrier or rupture discs 18 are constructed of cast aluminum, which will yield somewhat before actually breaking, having the effect of still further avoiding sharp shock forces. Other materials having similar properties may, of course, be substituted.

It should now be apparent that I have accomplished the objects heretofore set forth. I have provided an improvement in the construction of tensioning or stretching machines which is simple in nature and inexpensive to provide while being highly effective for the purpose intended. There is provided a simple arrangement for dissipating the recoil energy of a ruptured workpiece over an extended time period whereby to substantially reduce the magnitude of the forces involved, the invention having the ultimate effect of permitting lighter and simpler construction of the apparatus as a whole.

It should be understood, however, that the embodiment herein specifically illustrated and described is intended to be illustrative only, and reference should therefore be had to the following appended claims in determining the full scope of the invention.

I claim:

1. A shock absorber of the type adapted to be utilized with mechanisms for applying tension to an article and including gripping jaws received in a longitudinal opening of a gripper head, an elongated and open-ended sleeve, said sleeve having a greater internal dimension than the cross section of the article being worked and adapted to be rigidly mounted behind the gripping jaws of the tension applying device in axial alignment with the longitudinal opening of the gripper head and the workpiece, a plurality of replaceable regularly spaced breakable members received in said sleeve and adapted to apply incremental retarding forces to an article freed from the gripping jaws and moving rearwardly through said sleeve, and a damping cylinder having a restricted outlet adapted to be connected to the gripper head to yieldably resist rearward movement of the gripper head caused by the reaction of said incremental retarding forces.

2. A shock absorber of the type adapted to be utilized with mechanisms for applying tension to an article and including gripping jaws received in a longitudinal opening of a gripper head, an elongated and open-ended sleeve, said sleeve having a greater internal dimension than the cross section of the article being worked and adapted to be rigidly mounted behind the gripping jaws of the tension applying device in axial alignment with the longitudinal opening of the gripper head and the workpiece, and a plurality of replaceable regularly spaced breakable members received in said sleeve and adapted to apply incremental retarding forces to an article freed from the gripping jaws and moving rearwardly through said sleeve.

3. Apparatus according to claim 2 further characterized in that said breakable members comprise cast aluminum disc-like members having axially extending peripheral portions constituting spacing portions, and said sleeve being adapted to retain said plurality of said members in longitudinal stacked relation.

References Cited in the file of this patent

UNITED STATES PATENTS

| | | |
|---|---|---|
| 623,079 | Ellingwood | Apr. 11, 1899 |
| 1,870,419 | Palmer | Aug. 9, 1932 |
| 2,164,343 | Nighthart | July 4, 1939 |
| 2,275,573 | Sturm | Mar. 10, 1942 |
| 2,320,739 | Knudsen | June 1, 1943 |
| 2,401,748 | Dillon | June 11, 1946 |
| 2,412,731 | Hoffman | Dec. 17, 1946 |
| 2,685,961 | Schuler | Aug. 10, 1954 |